(12) United States Patent
Rinck

(10) Patent No.: US 8,490,936 B2
(45) Date of Patent: Jul. 23, 2013

(54) DECORATIVE LIGHT HANGING SYSTEM

(76) Inventor: Lance Rinck, Olathe, KS (US)

( * ) Notice: Subject to any disclaimer, the term of this patent is extended or adjusted under 35 U.S.C. 154(b) by 0 days.

(21) Appl. No.: 13/462,812

(22) Filed: May 2, 2012

(65) Prior Publication Data

US 2012/0280098 A1 Nov. 8, 2012

Related U.S. Application Data

(60) Provisional application No. 61/482,335, filed on May 4, 2011.

(51) Int. Cl.
*A47G 1/17* (2006.01)
(52) U.S. Cl.
USPC ..... 248/309.4; 248/304; 248/683; 248/206.5; 362/396; 362/398
(58) Field of Classification Search
USPC .................. 248/304, 309.4, 683, 309.1, 339, 248/206.5, 497; 362/382, 396, 398; 24/303; 16/320; 211/DIG. 1; 220/230, 324; 206/818
See application file for complete search history.

(56) References Cited

U.S. PATENT DOCUMENTS

| 6,217,192 | B1 * | 4/2001 | Stratton | 362/249.16 |
| 6,520,661 | B1 * | 2/2003 | Hill | 362/249.14 |
| 8,308,323 | B2 * | 11/2012 | Holland | 362/396 |
| 2009/0201685 | A1 * | 8/2009 | George | 362/398 |
| 2010/0116955 | A1 * | 5/2010 | Hayes et al. | 248/206.5 |
| 2012/0284969 | A1 * | 11/2012 | Fullerton et al. | 24/303 |

* cited by examiner

*Primary Examiner* — Todd M. Epps
(74) *Attorney, Agent, or Firm* — Intellectual Property Center, LLC; Arthur K. Shaffer

(57) ABSTRACT

The present invention provides a decorative light hanging system for presenting a lighted outline of a building structure, and includes a decorative lighting strand, a plurality of releasable magnetic alignment holder pairs each pair comprising oppositely charged magnetic disks including a first disk attached to the building structure and a second disk with a conduit mount attached thereon for receiving the decorative lighting strand therein, and a hanger for positioning and aligning the second disks upon the corresponding first disks.

3 Claims, 4 Drawing Sheets

DECORATIVE LIGHT HANGING SYSTEM

FIELD OF THE INVENTION

The present invention is directed towards a decorative light hanging system for presenting a lighted outline of a building structure.

BACKGROUND OF THE INVENTION

It has long been desirable to hang decorative lights on a building structure during the holiday season, as well as at other times of the year. Many solutions have been proposed regarding a means for temporarily securing a decorative light strand to a building structure. Simple solutions such as driving screws, nails, or staples into the building structure upon which the strand rests, or is held by, have been improved upon by those seeking to minimize the number of holes created in the building structure in a single use and on consecutive uses and to maximize the consistency of the display on each consecutive use.

Some of these improvements have involved the use of clips that can attach to eaves and guttering. The outline to be presented on the building structure, however, is generally not limited to the portion of the building structure that has eaves and guttering.

Other improvements include the use of a two-piece (or multi-piece) type device wherein a base attaches to the building structure and a mount secures the wire to the base. These multi-piece device bases are often bulky and unattractive when not coupled with the mounts and secured light strands, causing users to remove the base between each use and defeating the purpose of using a "permanent" base.

Another problem related to hanging decorative lights on a building structure is the danger and difficulty in reaching many edges of a building structure. Some building structures have steeply pitched rooflines and others have edges that are several stories above the ground. Prior attempts at decorative light systems involve hanging the strand on these difficult and dangerous building structures.

When mounting the strands onto the building structure, the strands must be placed onto whatever holder is used, whether those holders are nails, staples or clips. Some current solutions require the individual to be within close proximity, such as arm's length, of those holders. Many of these current solutions do not efficiently enable the mounting of the strand in the desired position in alignment and able to withstand the tension of the strand.

SUMMARY OF THE INVENTION

The present invention provides a decorative light hanging system for presenting a lighted outline of a building structure. The system includes a strand of decorative lights removably attached and aligned on the building structure by a plurality of releasable magnetic alignment holder pairs and a hanger that positions the pairs of releasable magnetic alignment holders onto the building structure.

In one embodiment, the system includes a plurality of magnetic alignment holders pairs including a first disk and a second disk. Said first and said second are being oppositely charged circular disks with a frustoconically shaped central depression associated with each of said first and second disks and having a leading edge and a trailing edge; said first disk being mounted to the building structure, with a fastener extending through said central depression and into the building structure said first disk leading edge associated with a lower fastener surface of said fastener and said first disk trailing edge associated with said upper fastener surface, thereby presenting a substantially planar outer surface; said second disk being secured to a conduit mount having a passageway for extending the strand therethrough, said passageway adapted for slidably receiving and supporting the strand upon the building structure; said second disk being mounted to a conduit mount with a second fastener extending through said second disk central depression for engagement with a backing surface said second disk leading edge associated with a lower fastener surface of said second fastener and said second disk trailing edge associated with said upper fastener surface thereby presenting a substantially planar second disk outer surface; a hanger having a magnetic structure for engagement of said backing surface; said hanger positioning said second disk for mounting upon said first disk in a magnetically aligned manner whereby the strand of decorative lights is arranged for selectively lighting the building structure.

In another embodiment, the hanger is adapted for removing the second magnetic disks from the first magnetic disks. This embodiment enables a consistent lighted outline of the building structure to be presented between each use of the system by maintaining the first magnetic disks in the desired position between each such use. The first magnetic disk presents a low profile that does not detract from the aesthetics of the building structure and may optionally be painted to match the coloration thereof without adversely affecting the performance of the system.

Various objects and advantages of the present invention will become apparent from the following description taken in conjunction with the accompanying drawings, which are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
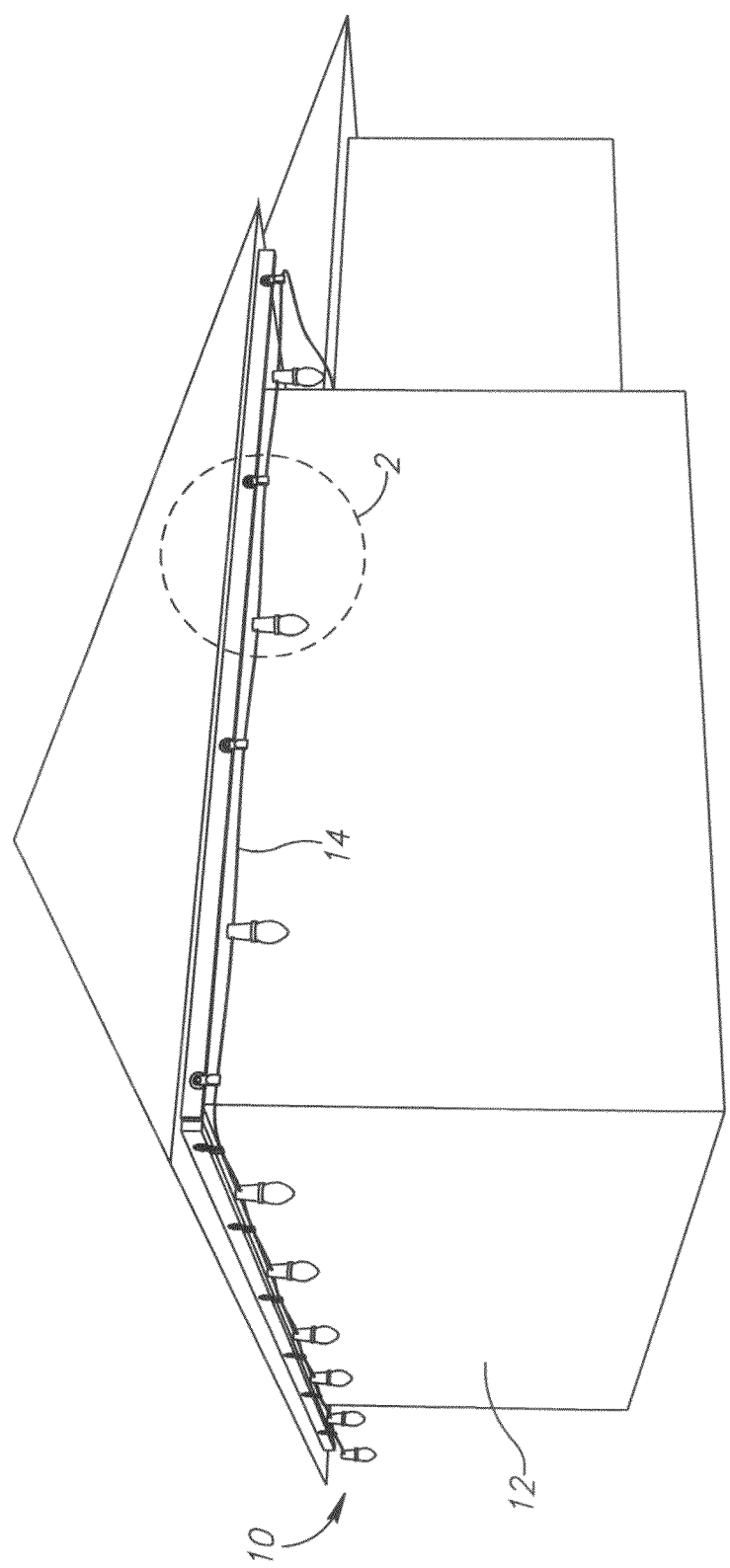
FIG. 1 is an isometric view of an embodiment of a decorative light hanging system for use in the present invention.

As illustrated in FIG. 1, reference number 10 generally refers to a decorative light hanging system which presents a lighted outline on a building structure 12. The system 10 includes a strand of decorative lights 14 removably attached to the building structure 12 by a plurality of releasable magnetic alignment holder pairs 20 wherein a hanger 40 positions the pairs of releasable magnetic alignment holders 20 on the building structure 12.

A typical decorative light strand 14 in association with the present invention includes a plurality of decorative lighting fixtures 18 spaced along a wired conduit 16. The decorative light strand 14 is generally known in the art. The lights may be either LED, incandescent, or any other illumination sources and the wired conduits 16 may be multistranded wired conduits 16 grouped together.

Each of the releasable magnetic alignment holders 20 comprise a pair of oppositely charged disks 22, a first and second disk 22a, 22b, and a conduit mount 32 for securing the wired conduit 16 to the building structure 12. In one embodiment, the pair of oppositely charged disks 22 is composed of an alloy of neodymium, iron, and boron like that used in neodymium magnets. In the illustrated embodiment, the pair of oppositely charged disks 22, each having a circular central depression 25 therein, allow the plurality magnetically paired disks 22 to have a very low profile when secured to the building structure 12 as illustrated in FIG. 3.

With respect to each disk, the magnetic field extends circumferentially from a first face to a second face of each disk, the first face and second face being oppositely charged surfaces. The resulting magnetic field forms a flux toroid associated with each disk. As the first and second disks are positioned in proximity to each other, the pair of flux toroids may facilitate alignment of the magnetic pair with each opposite charged disk being separated from each other as each magnetic flux toriod separates the magnetic disks. Each flux toroid has a specific magnetic capacity (also referred to herein as capacitors) which is defined qualitatively and quantitatively by the magnetic properties of each magnetic disk. As the disks are moved towards each other the magnetic flux capacitors vary. Preferably, the magnetic flux capacitor would be maximized with each oppositely charged face being positioned near each other and would be minimized when the similarly charged faces are spaced closest together.

Figure 2:
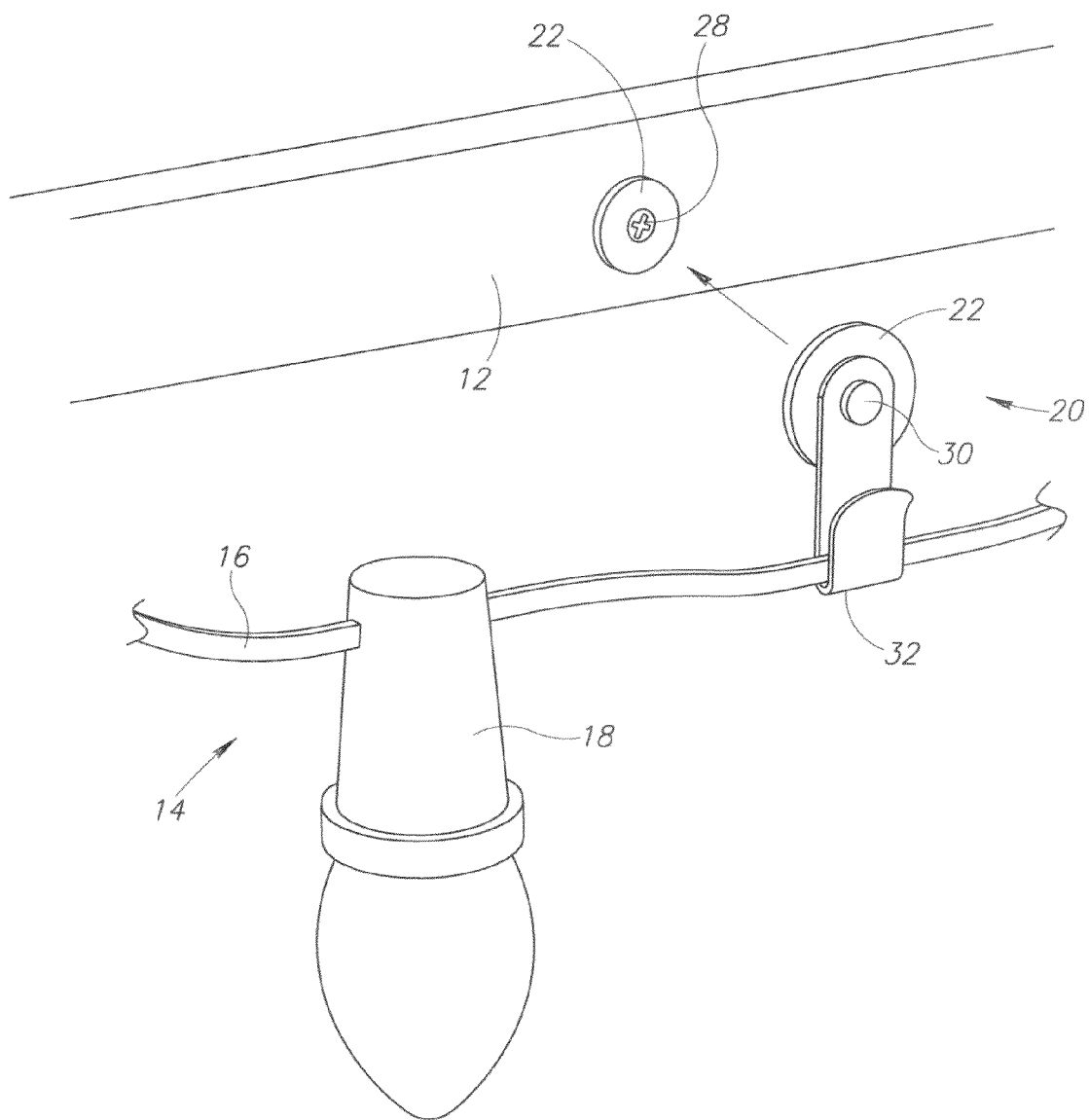
FIG. 2 is a detailed isometric view of an embodiment of a decorative light strand received by a pair of releaseable magnetic alignment holders for use in the present invention.
Figure 3:
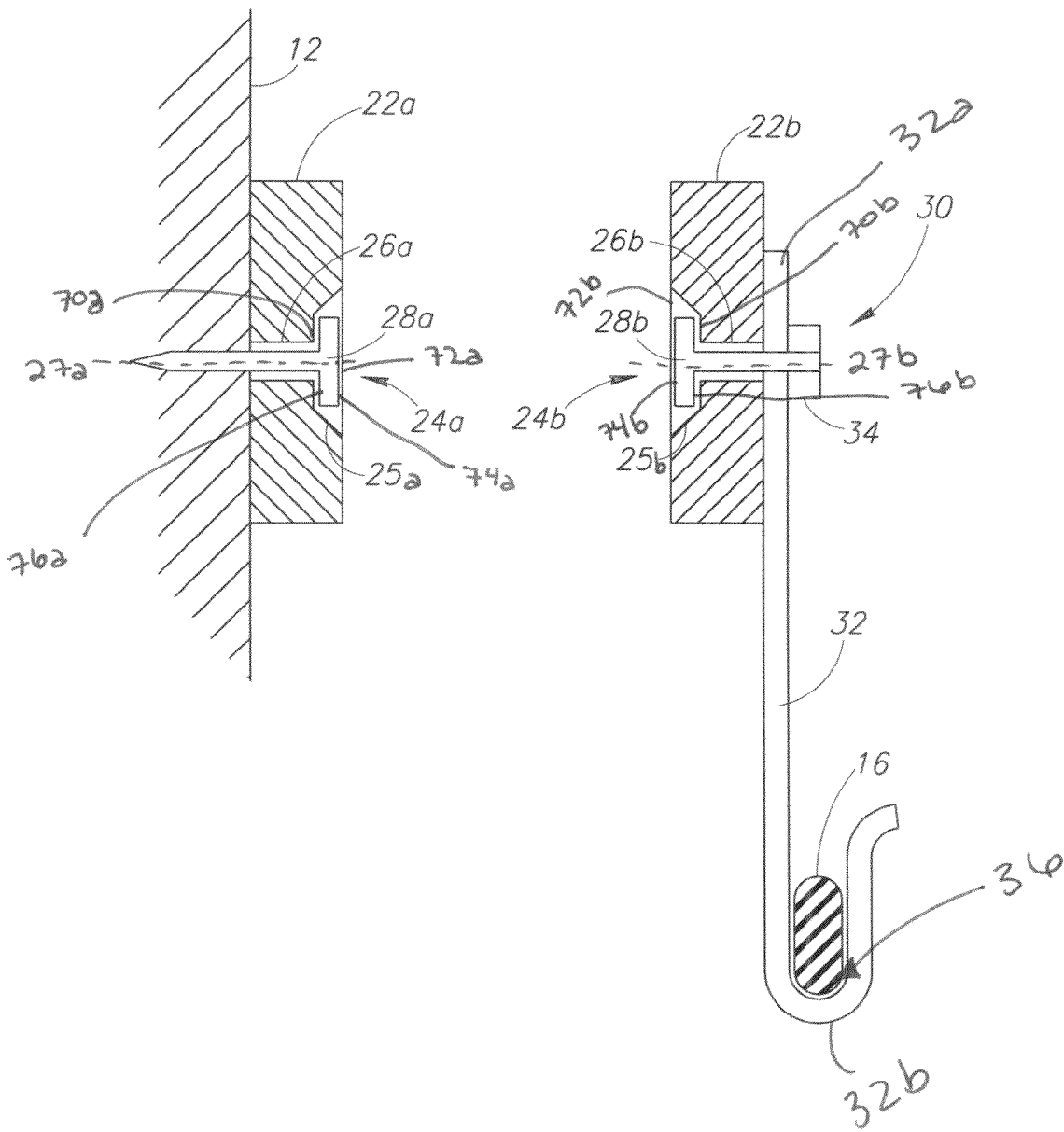
FIG. 3 is a cross section view of an embodiment of a pair of releasable magnetic alignment holders for use in the present invention.

As illustrated in FIGS. 2 and 3, the first disk 22a includes a first receiving region 24a concentrically aligned thereon and being in communication with the building structure 12 through a passageway 26a centrally located within a central depression 25a associated with an outer surface of said first disc 22a. The passageway 26a is generally sized to receive a fastener 28a having an upper surface 74a separated from a lower surface 76a, presenting a central axis 27a for securing the first disk 22a to the building structure 12. In the illustrated embodiment shown in FIG. 3, the central depression 25a has a frustoconical shape adapted for receipt of the fastener 28a therein. The frustroconically shaped depression 25a includes a leading edge 70a positioned towards said building structure 12 and a trailing edge 72a positioned away from said building structure 12 and associated with the outer surface of the first disc 22a. The leading edge 70a, in receipt of the lower fastener surface 76a, and the trailing edge 72a, in receipt of the upper fastener surface 74a, form a generally planar surface for magnetic receipt of said second disk 22b thereupon. An embodiment of the fastener 28a, 28b may include, but is not limited to a threaded screw.

In the illustrated embodiment of FIG. 3, the second disk 22b includes a second receiving region 24b concentrically aligned with a central depression 25b centrally located therein and associated with an outer surface of the second disc 22b. The second receiving region 24b is in communication with the conduit mount 32 through a second passageway 26b.

The second passageway 26b is generally sized to receive a fastener 28b having an upper surface 74b separated from a lower surface 76b and presenting a central axis 27b therethrough for securing the second disk 22b to the conduit mount 32, which is rotatable about the central axis 27b. In the illustrated embodiment, the central depression 25b has a frustroconical shape adapted for receipt of the fastener 28b therein, the frustroconically shaped depression 25b including a leading edge 70b positioned towards said conduit mount 32 and a trailing edge 72b positioned away from said conduit mount and associated with the outer surface of the second disk 22b. The leading edge 70b receives said lower fastener surface 76b while the trailing edge 72b receives said upper fastener surface 74b and formes a generally planar surface for magnetic receipt of the first disk 22a in a substantially planar orientation for alignment of said central axis 27b associated with said second disk 22b with the central axis 27a associated with said first disk 22a.

In the substantially planar orientation, the upper fastener surface associated with fastener 28a is generally coplanar with the trailing edge of the first disk 22a and the trailing edge of the second disk 22b is generally coplanar with the upper fastener surface associated with fastener 28b.

In the illustrated embodiment, the releasable magnetic alignment holders 20 align the decorative lighting strand 14 along the building structure 12 and the central axis associated with the first disk 22a is centrally aligned with the central axis of the second disk 22b for aligned magnetic engagement between the pair.

As illustrated in FIG. 3, the fastener 28b is threaded and extends through the second disk 22b and the conduit mount 32 and is received by a backing surface 34 which secures the conduit mount 32 to the second disk 22b by engagement with the fastener 28b. In the illustrated embodiment, the portion of the fastener 28b that extends outwardly from the conduit mount 32 presents a magnetically reactive axis 30 presenting a rotational surface which allows for a rotational magnetic field in operation of the present invention. Although the conduit mount 32 is illustrated with a U-shaped passageway 36 spaced opposite the central axis 27b, the conduit mount 32 extends between an upper end 32a and a lower end 32b with the lower end 32b presenting the U-shaped passageway and the upper end 32a presenting a mounting aperture (not shown) for securing the conduit mount 32 to the fastener 28b at the central axis 27b. Alternative configurations of the conduit mount 32 in accordance with the present invention may be utilized, including a flexible locking membrane, such as a "zip-tie," with a locking or fastening means for securing said second disk 22b to the wired conduit 16.

In operation, the decorative lighting strand 14 is placed selectively along a building structure 12 with a plurality of magnetic alignment holders 20 by placing a plurality of second disks 22b along the building structure. The first disk 22a is secured onto the building structure 12 with a fastener 28a extending through the central depression 25 and through the passageway 26a into the building structure 12, the head of the fastener being received by the central depression and aligned with the central axis extending therethrough. The decorative light strand 14 is then releasably placed on building structure 12 by aligning a second disk 22b in receipt of the conduit mount 32 securely fastened to the wired conduit 16 to a corresponding first disk 22a. The decorative light strand 14 is fastened to the conduit mount 32, a U-shaped passageway slidably engaging the wired conduit 16, thereby allowing for selective adjustment of the decorative light strand therein.

Figure 4:
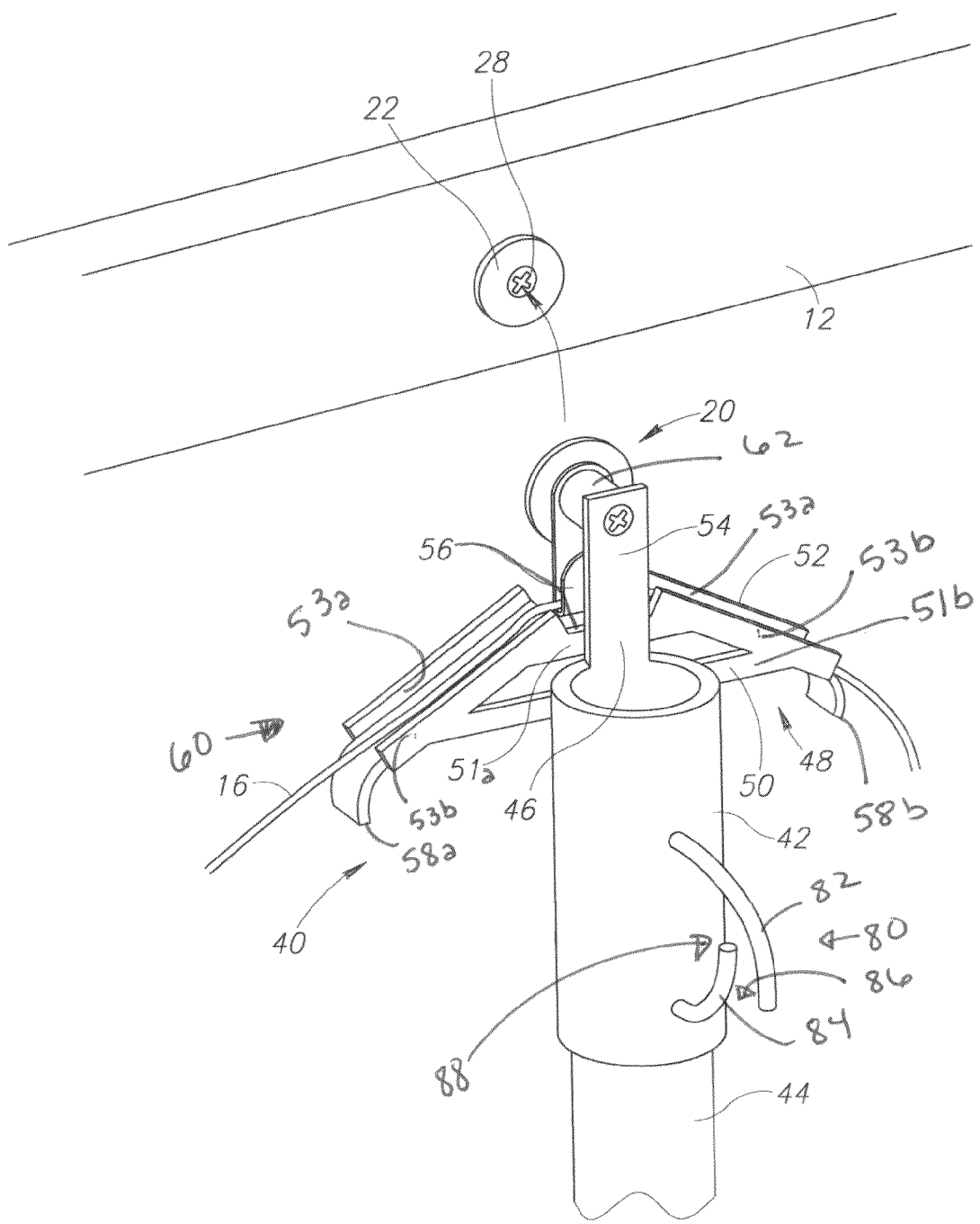
FIG. 4 is a detailed isometric view of an embodiment of a hanger and a pair of releasable magnetic alignment holders in receipt of a decorative light strand for use in the present invention.

Alternatively, a convenient hanger 40 with a masthead 42, as illustrated in FIG. 4, may be utilized with the masthead securely attached to a pole 44. As illustrated, the hanger 40 includes a pair of angled channels 48 extending outwardly therefrom may be utilized for placing the second disk 22b in alignment with the first disk 22a on the building structure. The ducts 48 receive the wired conduit 16 and are associated with a magnetically reactive structure 46 for engagement by the magnetically reactive stem 30 of each releasable magnetic alignment holder 20. The structure 46 includes a stabilizer 54 that presents a receiving slot 56 for receiving the stem 30 therein. When the stem 30 is received in the receiving slot 56, the stabilizer 54 restricts the rotational movement of the second disk 22b.

The hanger 40, as illustrated, is fixed to an extendable pole 44, threaded to the top of the extension pole 44 at a masthead 42, incorporating a cylindrical body and presenting a trussed structure 60 extending therefrom. As illustrated in FIG. 4, the masthead 42 comprises a cylindrical sleeve attached to the end of the pole 44 for positioning each of the second disks 22b on the oppositely charged first disks 22a. The pole 44 may be one which is well known, such as a telescopically extendable painterpole. The masthead 42 is attached to the pole 44, for example, with a helical thread located on the interior wall of the cylindrical sleeve for threaded receipt of one end of the pole 44.

The trussed structure includes a pair of angled channels 52. The channels 52 generally present a passageway extending between a first downwardly depending arcuate lip 58a, along a first portion of the passageway 52a, and a second portion of the passageway 52b connected by a spanning alignment guide 56 and terminating at a second downwardly depending arcuate lip 58b, with said passageway receiving said wired conduit and the plurality of light fixtures 18. The downwardly depending arcuate lips 58a, 58b present rounded edges to help prevent unnecessary breakage of the received light fixtures 18 as they pass through the passageway 52a, 52b while providing adequate space for passage of the light fixtures 18 therethrough as the wired conduit 16 is extended along the building structure 12.

The trussed structure 60 further includes an upper and a lower cross-support member 51a, 51b, which span the angled channels 52 with the upper cross-member support 51a presenting the spanning alignment guide 56 and both the upper and lower cross-member supports 51a, 51b being secured to the hanger 40. The upper and lower cross-member supports maintain the angled channels preferably between 15 degrees to 60 degrees, preferably 45 degrees, relative to the lower cross-support member 51b.

As illustrated in FIG. 4, each angled channel 52 has a front and rear wall 53a, 53b spanning the defined passageway 52a, 52b and the front and rear wall 53a, 53b may be similarly dimensioned. Alternatively, a shortened front wall (not shown) may be provided which will allow for improved forward receipt and release of the decorative light strand 14 without causing unnecessary damage to any received light fixtures 18 during operation.

The spanning alignment guide 56 is positioned below a stabilizer 54 for receipt of the second disk 22b by a charged magnetic structure 62 while providing desired support for the conduit mount 32 as the second disk 22b is raised and positioned for alignment onto the building structure 12 with the first disk 22a. The magnetic structure 62 is preferably charged similar to the first disk 22a for securing the backing surface 34 while securing and guiding the conduit mount 32 for magnetic connection of the second disk 22b by the first disk 22a.

Generally, the illustrated hanger 40 allows for both alignment and magnetic adherence between the plurality of magnetic alignment holders 20 spatially positioned along the building structure 12 while a magnetically inert catch 80 is further illustrated in FIG. 4 for removal of the decorative lighting strand 14. The catch 80 extending outwardly from the masthead 42 in the illustrated dual arcuate arrangement, includes an upper downwardly depending arcuate member 82 and a lower upwardly depending arcuate member 84, with the upper arcuate member 82 extending outwardly from the lower arcuate member 84 and presenting a receiving region 86 and a capture region 88 for passage of the mounted wired conduit 16 between the receiving region 86 into the capture region 88 for capture and removal of the magnetically mounted wired conduit 16 from the building structure 12. The receiving region 86 is presented by the portion of the upper arcuate member 82 extending outwardly from the lower arcuate member 84 and the capture region 88 is presented between the masthead 42 and the lower arcuate member 84 and complementary portion of the upper arcuate member 82.

In operation, the system 10 presents a lighted outline of the building structure 12 by spacing the releasable magnetic alignment holders 20 thereon. The magnetic alignment holders 20 releasably hold and align the decorative light strand 14 along the building structure 12. The first disks 22a are attached to the building structure 12 along the desired lighting pattern (e.g., an outline of the building structure's 12 edges and or roofline) for receipt of the second disks 22b. The wired conduit 16 is secured by the U-shaped passageways 36 associated with the conduit mount 32 at desired intervals and the hanger 40 is used to position and align the second disks 22b upon the first disks 22a. The hanger 40 with the optional catch may be used to grasp and remove the decorative light strand 14 from the building structure 12 by pulling the second disks 22b off of the first disks 22a.

A consistent lighted outline of the building structure 12 is maintained between each use of the system 10 by leaving the first disks 22a attached to the building structure 12 between each use. This allows the second disks 22b, holding the decorative light strand 14, to be reattached to the building structure 12 in identical positions on each consecutive use of the system 10. The low profile of the first disks 22a, with the fastener 28a being seated within the central depression 25a, therein create a substantially planar surface, limiting any undesirable obstructions for receipt of the second disks 22b by the first disks 22a and adding a nearly unnoticeable aspect to the building structure 12. The first disks 22a may even be optionally painted to match the coloration of the building structure 12 without adversely affecting the function of the system 10, thus further camouflaging the appearance of the first disks 22a.

It is to be understood that while certain forms of the present invention have been illustrated and described herein, it is not to be limited to the specific forms or arrangement of parts described and shown.

What is claimed and desired to be secured by Letters Patent:

1. A decorative light hanging system for releasably aligning a strand of decorative lights upon a building structure said system comprising:
    a pair of magnetic alignment holders including a first disk and a second disk said first and said second disks being oppositely charged circular disks;
    a frustoconically shaped central depression associated with each of said first and second disks and having a leading edge and a trailing edge;
    said first disk being mounted to the building structure with a fastener extending through said central depression and into the building structure said first disk leading edge associated with a lower fastener surface of said fastener and said first disk trailing edge associated with said upper fastener surface thereby presenting a substantially planar outer surface;

said second disk being secured to a conduit mount having a passageway for extending the strand therethrough, said passageway adapted for slidably receiving and supporting the strand upon the building structure;

said second disk being mounted to a conduit mount with a second fastener extending through said second disk central depression for engagement with a backing surface said second disk leading edge associated with a lower fastener surface of said second fastener and said second disk trailing edge associated with said upper fastener surface thereby presenting a substantially planar second disk outer surface;

a hanger having a magnetic structure for engagement of said backing surface; and said hanger positioning said second disk for mounting upon said first disk in a magnetically aligned manner whereby the strand of decorative lights is arranged for selectively lighting the building structure.

2. The decorative light hanging system of claim 1 wherein said hanger further includes a hook.

3. The decorative light hanging system of claim 1 wherein said hanger further includes a trussed structure.

* * * * *